A. W. FISHER.
LOCKING LINK.
APPLICATION FILED SEPT. 9, 1919.

1,379,620.

Patented May 31, 1921.

INVENTOR
ARTHUR W. FISHER

BY
Frank Keiper
ATTORNEY

UNITED STATES PATENT OFFICE.

ARTHUR W. FISHER, OF PULTNEYVILLE, NEW YORK.

LOCKING-LINK.

1,379,620.  Specification of Letters Patent.  Patented May 31, 1921.

Application filed September 9, 1919. Serial No. 322,675.

*To all whom it may concern:*

Be it known that I, ARTHUR W. FISHER, a citizen of the United States, residing at Pultneyville, in the county of Wayne and State of New York, have invented certain new and useful Improvements in Locking-Links, of which the following is a specification.

The object of this invention is to provide a new and improved form of locking link for the non-skid chains ordinarily used on automobile tires, the locking link being made of a single piece of metal.

This and other objects of the invention will be fully illustrated in the drawing, described in the specification and pointed out in the claims at the end thereof.

In the accompanying drawing.

In the several figures of the drawing, like reference numerals indicate like parts.

Figure 1:
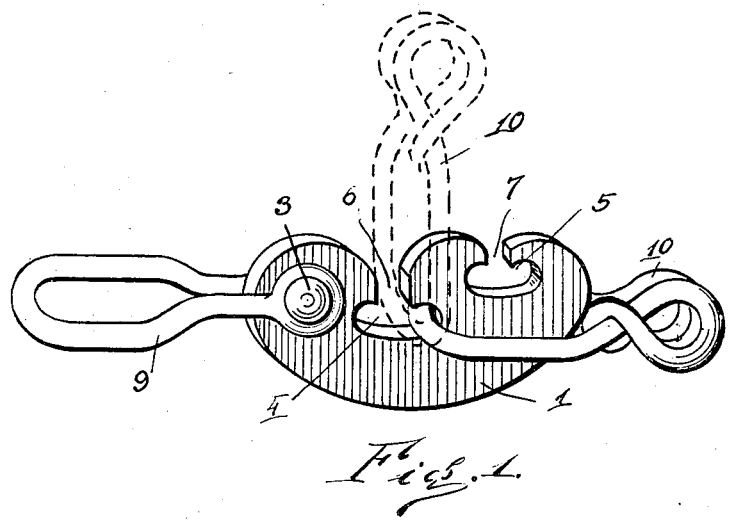
Figure 1 is a detail perspective view of the locking link with a chain link attached to each side thereof.

The locking link forming the subject matter of this invention is intended for use more especially in connection with automobile tire chains, although it may be used with other chains as well.

The link comprises a single plate 1 which is made preferably of malleable cast iron. Near one end of the plate is a perforation 2 adapted to receive a bolt or rivet 3, by means of which the chain 9 is permanently fastened to the locking link 1. Near the middle and at the other end of the plate are provided the elongated openings 4 and 5. Each of these openings has a slot 6 and 7, respectively, extending from the middle of one side thereof to the edge of the plate. These slots have rounded sides, the slots being wide at the top with the sides thereof curving inwardly toward each other about half the length of the slots. The lower half of the slots is made with straight sides with the opening just wide enough to admit the link 10 when placed vertically in line therewith.

Figure 3:
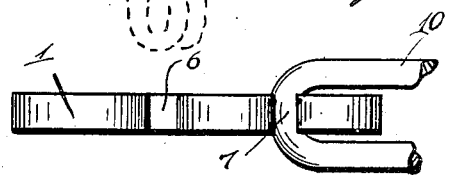
Fig. 3 is a top plan view of the locking link.

The plate is made of sufficient thickness to make the sides of each of the slots of a width that prevents the curved end of the link 10 from rising into the slot when placed in any but the vertical position shown in dotted lines in Fig. 1. This is illustrated in Fig. 3.

Each of the elongated openings 4 and 5 is curved upwardly at the ends and downwardly toward the sides of the slots 6 and 7 respectively, the corners of the slots 6 and 7 extending slightly down into the elongated openings on that account, for a purpose that will presently appear.

As shown in Fig. 1, the locking link is preferably fastened to the chain at the left hand end by the rivet or bolt 3 which passes through the eye 2 of the locking link and the eyes of the chain link 9. The link 9 holds the plate 1 in an upright position so that the link 10 of the free end of the chain may be connected to the plate as follows:

The link 10 is first held in a vertical position with its forward end down as shown in dotted lines in Fig. 1 immediately over the slot in the plate to which it is desired to connect it. The link 10 is then moved down until the lower end engages the elongated openings 4 or 5, after which the top of the link 10 is turned down to the right over the right hand end of the plate. The link 10 is then locked within the opening.

When moved from the vertical position to the horizontal position as above pointed out, the closed end of the link 10 is drawn in to the right hand end of the elongated opening 4 as the other end of the link slides down the curved right hand end of the plate. The position of the drawing eye with reference to the elongated openings and the curved back of the locking link riding on the periphery of the tire holds the free end of the locking link elevated thereby holding the chain link below and back of the free end of the locking link which in turn prevents the chain link from rising into a vertical position favorable for an automatic unlocking of the chain link from the locking link.

If the link 10 moves endwise of the elongated opening, the downwardly extending corners of the slot 6 will always deflect the inner end of the link downward as it slides by them so that the end of the link 10 will pass under the entrance of the slot 6 and will not rise up and disengage itself from the plate. If for any reason the link 10 should at any time assume the dotted line position shown in Fig. 2, in which the free end of the link has entered the slot 6, it is prevented from disengaging itself fully from the plate because the distance from the bottom of the plate 1 to the outer end of the slot 6 at the top of the plate is greater than the length of the link 10 so that it cannot move out of the slot 6.

The second opening 5 with the slot 7 is provided in the plate in order that the chain may be slightly lengthened by having the free link 10 of the chain engage the opening 5 near the end of the plate rather than the opening 4 near the middle thereof. The opening 5 is also used in adjusting the chain to the wheel. The shape of the opening 5 is the same as that of the opening 4 and the function of it is the same.

Figure 2:
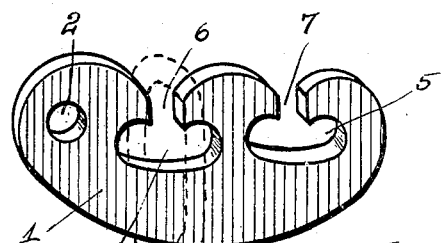
Fig. 2 is a perspective view of a modified form of the locking link.

In Fig. 1 the opening 5 is shown on a higher level than the opening 4. This makes the plate stronger at the right of the opening 4. The openings may, however, be placed side by side as shown in Fig. 2.

To unlock the chain from the locking link, the link 10 of the chain must first be turned into the upright dotted line position shown in Fig. 1 and its lower end must then be raised through the slot out of engagement with the plate. Instead of moving the link 10 the plate may be moved backward until the same relative position between the plate and the link 10 is reached, in which position the link 10 can be withdrawn from the slot in the plate.

In view of the foregoing it is not necessary to close either of the slots 6 and 7 with auxiliary means to prevent the chain from automatically unlocking itself.

It will be seen from the foregoing that the shape of the locking holes in the locking plate is substantially the same as the shape of a mushroom or toadstool in cross section.

I claim:

1. A locking link comprising a single piece of metal having a hole therein and having a slot cut into one side thereof and forming an entrance thereto, said hole extending substantially equal distances on both sides of said slot.

2. A locking link comprising a single piece of metal having a hole therein and having a slot cut into one side thereof and forming an entrance thereto, said slot having parallel sides that permit the passing of the arched end of the closed link only when it is in an upright position.

3. A locking link comprising a single piece of metal having a hole therein and having a slot cut centrally into one side thereof and forming an entrance thereto, the upper side of the hole having downwardly curved shoulders at each side of the slot.

4. A locking link comprising a single piece of metal having a hole therein and having a slot cut into one side thereof and forming an entrance thereto, a closed link having one end engaging said hole and the other end spanning the end of the link, the ratio of the length of the closed link and the length and width and shape of the locking link being such that the closed link can be released from the locking link only when it is in an upright position, extending upwardly from the hole.

5. A locking link comprising a single piece of metal having a round bearing hole at one end and having a mushroom shaped hole therein about the middle of the plate and a second mushroom shaped hole located at the other end of the plate.

6. A locking link comprising a metal plate having a pivot eye in one end thereof, the plate being cam shaped on the other end, a hole in the plate, a slot cut into one side of the plate and forming an entrance to the hole, a link on one end of the plate connected to the pivot eye, a link on the other end of the plate engaged with the hole, said link being moved to engage with the end of the hole by the cam shaped end and standing normally in line with the cam when the chain is stretched.

7. A locking link comprising a metal plate having a pivot eye in one end thereof, a hole extending lengthwise thereof and having a slot cut into one side thereof and forming an entrance thereto, a link on one end of said plate connected to the pivot eye, a link on the other end of said plate engaged with the hole, said plate being wider than the opening in said link, said plate being shaped to permit said link to swing freely either above or below it while engaged therewith.

In testimony whereof I affix my signature.

ARTHUR W. FISHER.